United States Patent [19]
Brown

[11] 4,045,123
[45] Aug. 30, 1977

[54] CONTROL DEVICE TO POSITION PROJECTION SCREEN FOR VIEWING

[75] Inventor: Donald J. Brown, Naperville, Ill.

[73] Assignee: Knox Manufacturing Co., Wood Dale, Ill.

[21] Appl. No.: 647,869

[22] Filed: Jan. 9, 1976

[51] Int. Cl.² .......................................... G03B 21/56
[52] U.S. Cl. .................................. 350/117; 160/310; 200/61.16; 200/61.41; 200/61.62
[58] Field of Search ...................... 160/310; 200/61.76, 200/61.62, 61.16, 61.39, 61.41, 61.42; 350/117

[56] References Cited

U.S. PATENT DOCUMENTS

| | | | |
|---|---|---|---|
| 3,126,805 | 3/1964 | Schroder et al. | 200/61.62 X |
| 3,254,167 | 5/1966 | Altmann | 200/61.41 X |
| 3,355,149 | 12/1967 | Wiegelmann et al. | 160/310 X |
| 3,467,797 | 9/1969 | Revell | 200/61.16 |

Primary Examiner—Richard A. Wintercorn
Attorney, Agent, or Firm—Wegner, Stellman, McCord, Wiles & Wood

[57] ABSTRACT

A projection screen apparatus includes an elongate roller, a flexible screen which is wound on the roller when it is in a closed position and unwound from the roller when it is in an exposed position, an electric drive motor connected to the roller for rotating the roller to move the screen between exposed and closed positions, a first switch for actuating the drive motor to move the screen toward an exposed position, and a second switch for stopping the drive motor and the roller when the screen is in a fully exposed position. A lever urged against the screen wound on the roller moves the second switch to an inoperative position when a predetermined amount of screen is unwound from the roller to interrupt the electric circuit leading to the drive motor.

10 Claims, 12 Drawing Figures

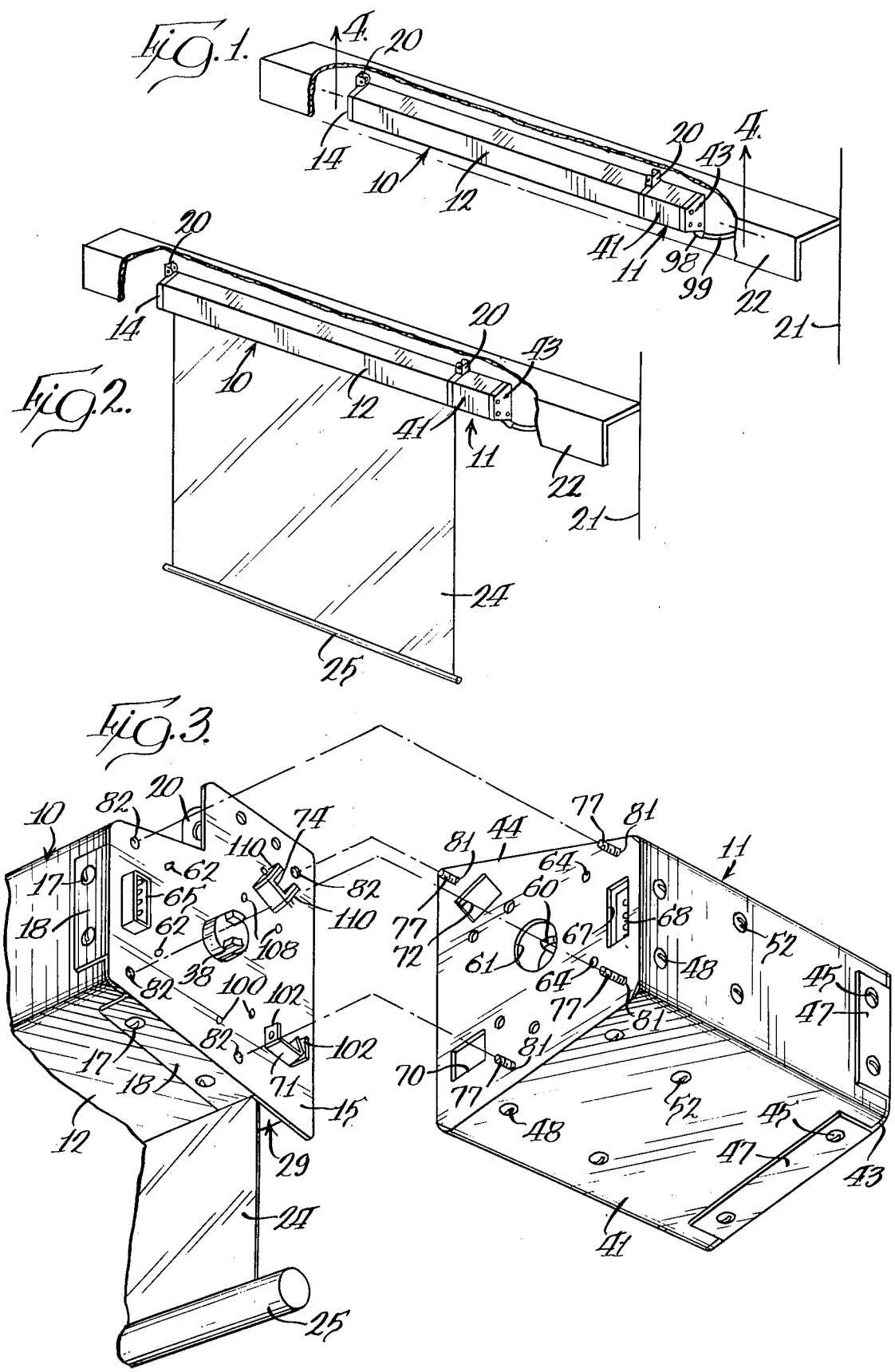

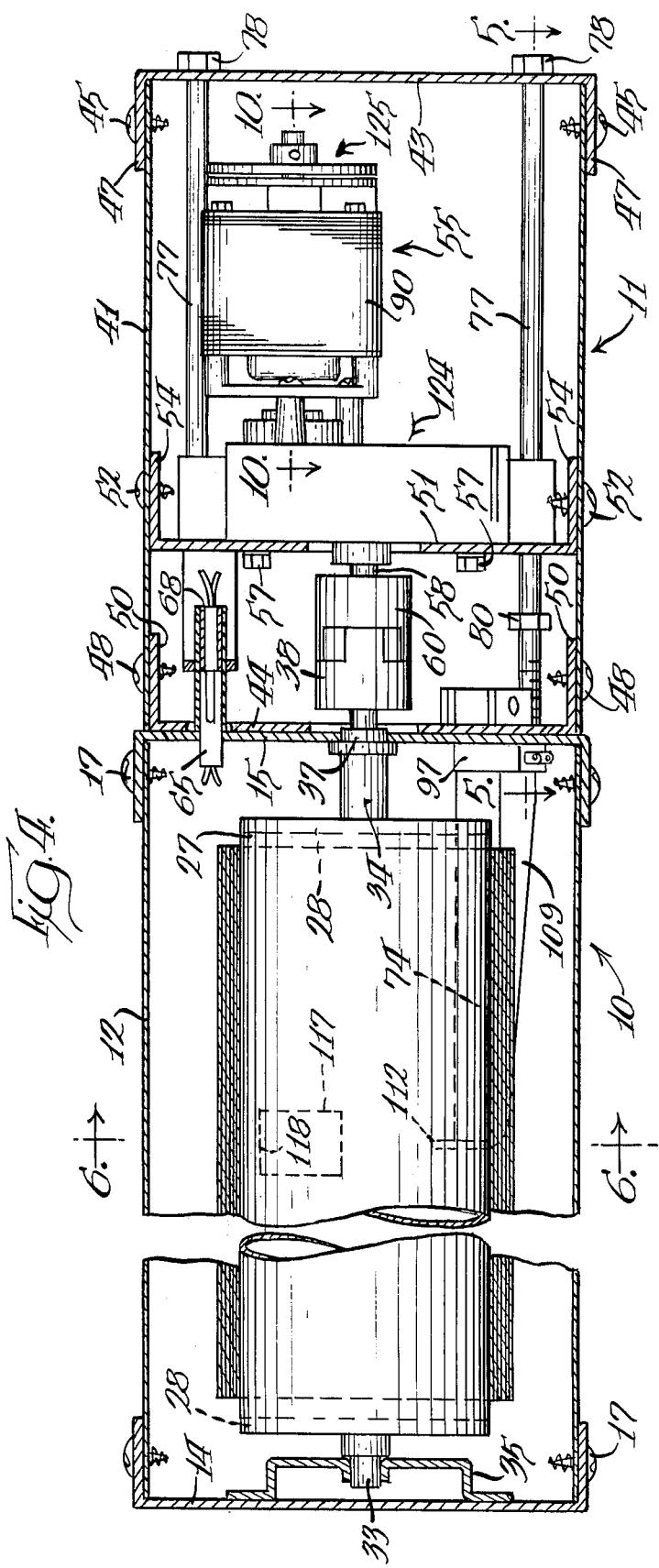
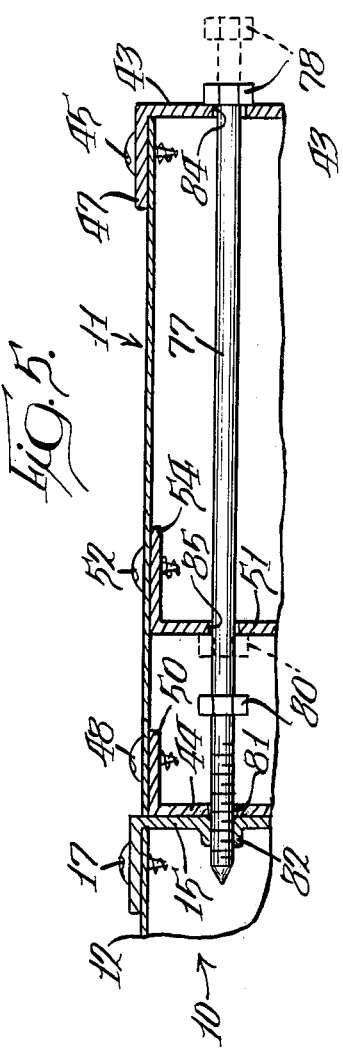

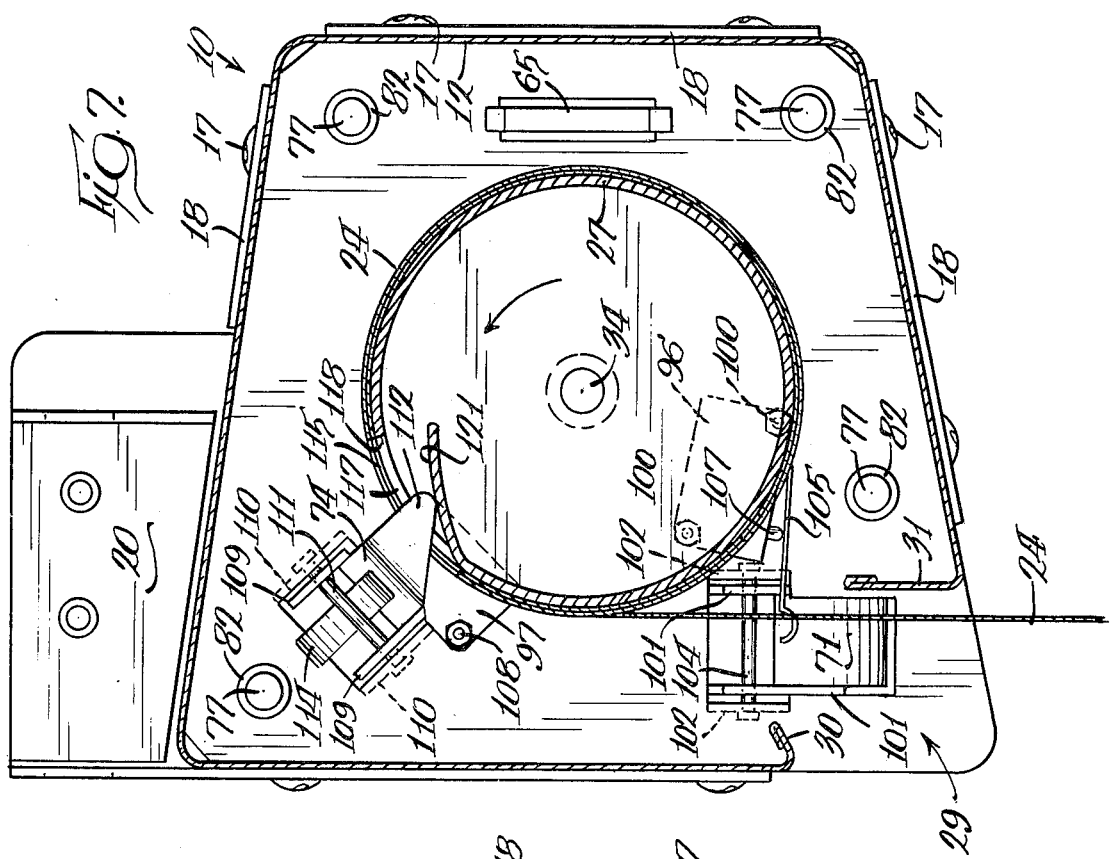
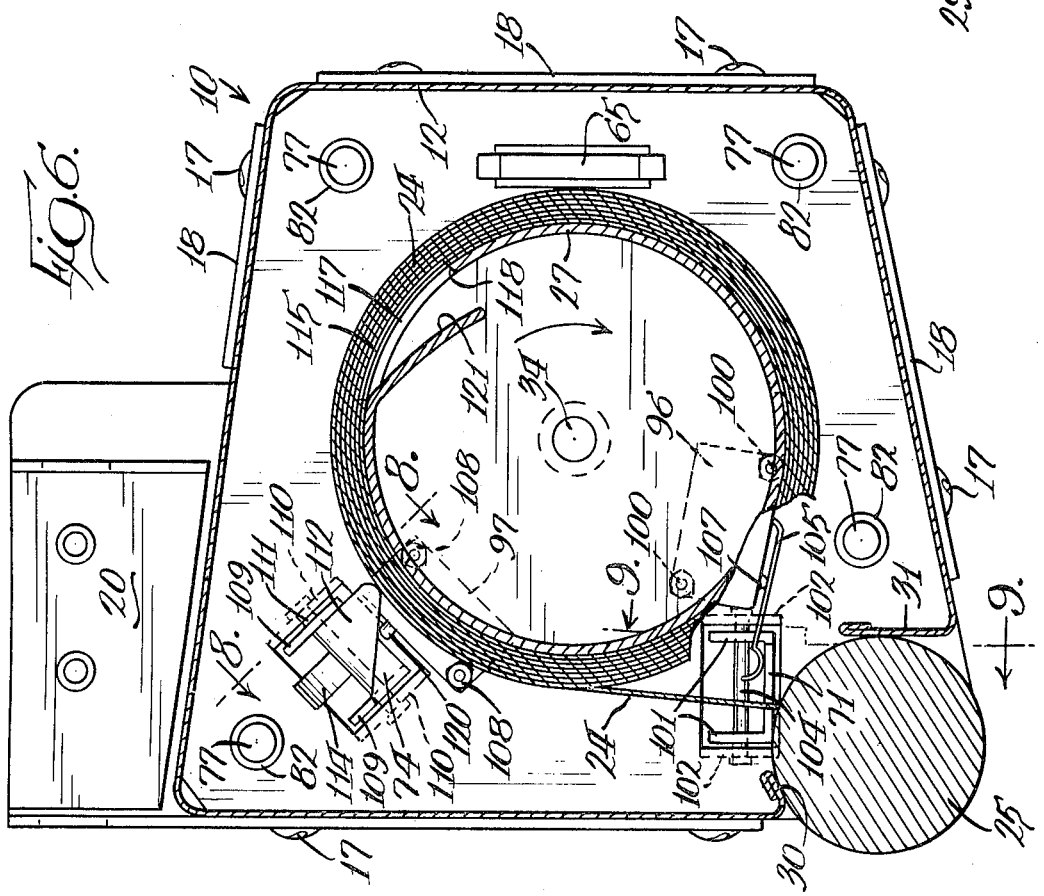

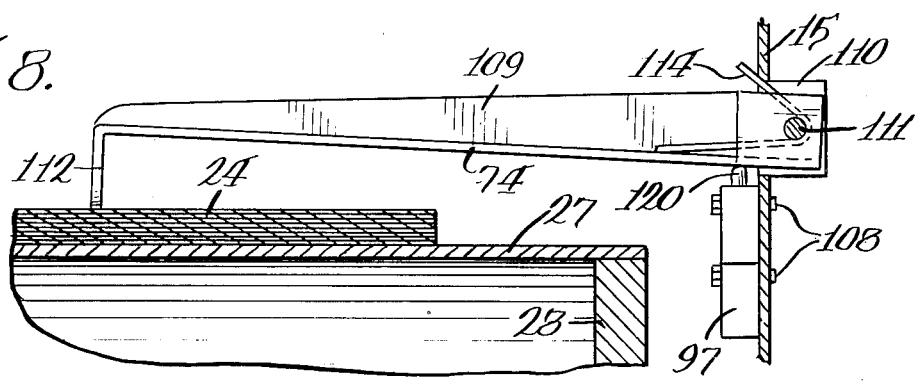
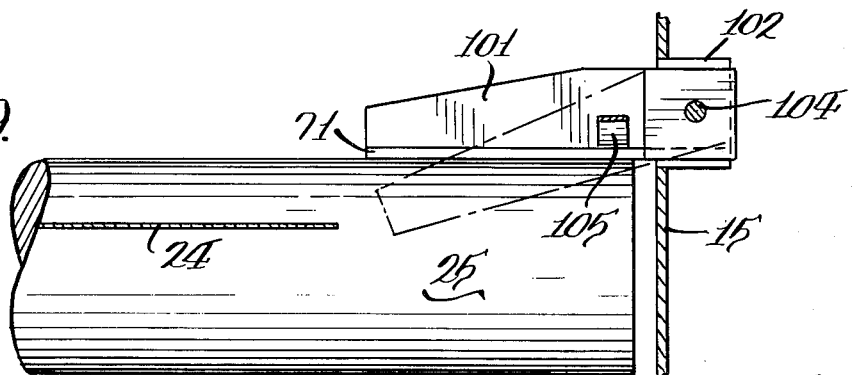
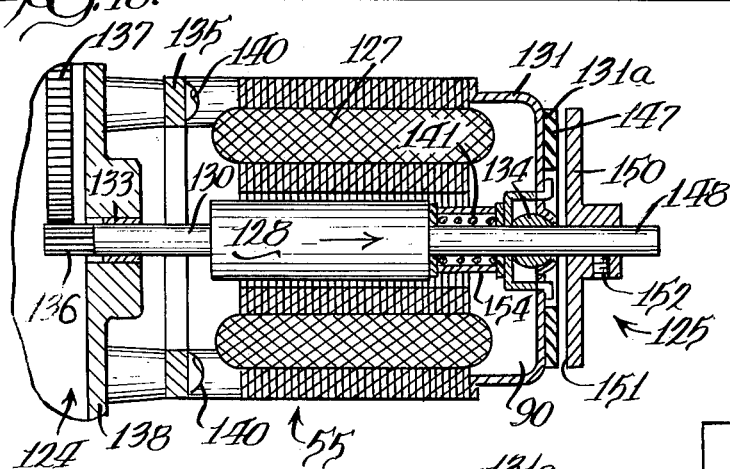

CONTROL DEVICE TO POSITION PROJECTION SCREEN FOR VIEWING

BACKGROUND OF THE INVENTION

The present invention relates generally to a projection screen apparatus and more particularly to a control mechanism for a motor-driven projection screen apparatus.

While the size of the projection screen is not of the essence, these screens which are intended for use with the present invention are generally quite large, ranging in width from 5 to 14 feet, or more. They are the type of screens which are frequently found in auditoriums, in school rooms or in conference rooms. They are remotely controlled electrically by a small electric motor having a rotatable shaft which is operatively coupled to a large roller. The roller is generally journaled in a casing and the casing houses both the roller and the electric motor. The screen is, of course, rolled upon the roller when the screen is moved to a closed position and unrolled from the roller when it is moved to an exposed viewing position.

Generally, a master control switch is provided and is selectively operable to move the screen between open and closed positions. The master control switch may be moved to a first condition wherein the motor turns the roller to permit the screen to be played out from the roller or to a second condition wherein the motor reverses and turns the roller to wind the screen on the roller. Usually, the operator must carefully regulate the master control switch so that the motor is turned off just as soon as the screen is fully retracted or fully extended in order to prevent damage to the screen.

One device in the prior art which attempts to include an automatic shutoff, so as to eliminate the need for operator regulation, employs a worm gear on which a traveler nut having a pair of switches is movably disposed. As the roller rotates the traveler nut moves along the gear which rotates along with the roller. Also included in the device are a pair of adjustable actuators, each of which cooperates with one of the switches. As the traveler nut moves toward the end of the gear, the plunger on one of the switches is depressed by one of the actuators to terminate the operation of the motor. A significant problem of the device is adjusting the actuators so that the motor driving the roller stops at the proper time. It is necessary to determine the number of worm gear rotations corresponding to the extended and retracted position of the roller and, thereafter, the actuators are set. Because of the wriggle of the traveler on the gear and the tolerances in the actuators and the switch plungers, it is extremely difficult to achieve accurate and permanent adjustment of the device. Hence, positive and faultless termination of the screen movement may not always be achieved. The screen may retract or play out beyond a predetermined desirable position.

SUMMARY OF THE INVENTION

It is the principal object of the present invention to provide a motor-driven projection screen apparatus which includes an improved and simple mechanism for automatically and accurately terminating the playing out of the screen whenever the screen is fully extended. It is a further object of the present invention to provide a mechanism which positively locks the screen in its extended position to prevent the screen from being played out further.

In accordance with the present invention, the screen is wound on a roller and a pivoted lever is urged radially inward into contact with the screen material wound on the roller so as to ride thereon. When the screen is played out from the roller to its fully extended position, the lever will be moved inwardly toward the roller an amount sufficient to enable the lever to depress the button of a switch which opens the circuit between a source of electric current and the motor which drivingly operates the roller. Thus, the motor is stopped and movement of the screen is terminated. The screen apparatus is deactivated when the screen is actually fully played out and is not dependent on the number of revolutions of the roller or the like. Hence, the mechanism positively stops the roller from unwinding in an accurate and foolproof manner.

In an exemplary embodiment of the present invention, an angled lever end portion contacts the wound screen to space the remainder of the lever from the screen. When the screen is fully extended, the end portion is urged into a depression formed in the roller. A slot is formed in any screen material which remains wound on the roller so that the end portion can pass therethrough into the depression. The entry of the foot into the depression of the roller accentuates the lever movement to assure proper actuation of the switch button associated therewith.

In a preferred embodiment, the depression has a ramp or camming surface so that upon reversal of the roller, the foot easily rides out of the depression and back onto the screen material as the screen is rewound onto the roller toward a retracted closed position.

A further feature of the present invention is the utilization of a control circuit wherein the playing out of the screen is terminated regardless of the operator's activation of a master control switch which initiates playing out of the screen.

BRIEF DESCRIPTION OF THE DRAWINGS

FIG. 1 is a perspective view of the motor-driven projection screen apparatus of the present invention mounted on a wall behind a valance with portions of the valance broken away to show the flexible projection screen in its retracted closed position;

FIG. 2 is another perspective view of the apparatus of FIG. 1 showing the screen in its fully extended, exposed viewing position;

FIG. 3 is an enlarged exploded perspective view of the motor-driven projection screen apparatus showing an end portion of the modular screen unit and portions of the modular drive motor unit to illustrate the manner of mounting the units together;

FIG. 4 is an enlarged broken sectional view of the apparatus taken as indicated on line 4—4 of FIG. 1;

FIG. 5 is a broken sectional view taken as indicated on line 5—5 of FIG. 4 particularly showing one of the bolts which detachably or releasably secure the modular drive motor unit to the modular screen unit;

FIG. 6 is an enlarged sectional view taken as indicated on line 6—6 of FIG. 4 showing the roller and the pivoted control levers when the projection screen is in its closed position;

FIG. 7 is a sectional view of the apparatus similar to FIG. 6, but showing the roller and the pivoted control levers as positioned when the screen is nearly fully extended;

FIG. 8 is a sectional view taken as indicated on line 8—8 of FIG. 6 with certain parts broken away and particularly showing the cooperative relationship between the micro switch and the control lever with the control lever being precluded from depressing the micro switch because the free end of the control lever is riding on or engaging the convolutions of screen on the roller;

FIG. 9 is a sectional view taken as indicated on line 9—9 of FIG. 6 with certain parts broken away and showing the portion of the screen slat which cooperates with a lever to control a micro switch to deactivate the electric motor with the screen rolled up in closed position;

FIG. 10 is an enlarged broken sectional view of the electric gear motor taken as indicated on line 10—10 of FIG. 4 showing the rotor and its shaft shifted axially to operative position to compress the spring means and to shift the brake to released position;

FIG. 11 is a further enlarged broken sectional view similar to FIG. 10 but showing the rotor and its shaft shifted to inoperative position by the spring means which in turn shifts the brake to a holding position; and FIG. 12 is a schematic diagram of the electrical circuit which controls the operation of the roller of the projection screen apparatus to move the flexible screen between a closed position and an exposed operative viewing position.

DESCRIPTION OF THE PREFERRED EMBODIMENT

1. Modular Motor Driven Projection Screen Apparatus

The modularity of the projection screen apparatus is shown in FIGS. 1-5. The apparatus includes a modular screen unit, generally designated 10, and a modular drive motor unit generally designated 11, mounted adjacent thereto in a manner to be somewhat of a longitudinal extension of the unit 10.

The modular screen unit 10 preferably has a conventional outer casing 12 which is constructed to provide an elongated inner chamber which is preferably closed at its opposite ends by a pair of removable end caps 14 and 15 so as to substantially close the modular screen unit 10. The end caps 14 and 15 are secured to the exterior of the outer wall of casing 12 by machine screws 17 passing through inwardly extending flanges 18 carried by the end caps 14 and 15 and threaded into the end portions of the casing 12. Each of the end caps 14 and 15 is preferably provided with a bracket 20 for mounting the screen modular unit 10 on a supporting surface, such as on a wall 21, behind a valance 22, in a recess in the ceiling, or the like.

A flexible screen 24 having a conventional slat 25 fixed transversely to its free marginal edge portion is movable between a retracted closed position (shown in FIG. 1) and an exposed operative position (shown in FIG. 2) through a longitudinal slot or opening 29 in the casing 12. The flexible screen 24 is carried on an elongated roller 27, which is preferably hollow. Herein, the roller 27 may be closed at each end by a disk 28.

The inner marginal edge portion of the screen 24 is preferably adhered longitudinally of the roller 27, and then two or three convolutions of the screen 24 are preferably wound about the roller 27 so that the adhered marginal edge portion of the screen 24 will be securely fastened to the roller 27. As noted in FIG. 7, a couple of turns of the screen 24 will preferably remain circumposed on the roller 27 when the screen 24 is lowered to fully extended exposed operative position.

As more clearly shown in FIGS. 6 and 7, the screen 24 is played out to its exposed position through the longitudinal slot or opening 29 extending between end caps 14 and 15 and defined by a pair of inwardly extending flanges 30 and 31 of the wall of casing 12. When the flexible screen 24 is rewound on the roller 27 to its closed position, the entire length of slat 25 is nested in the elongated slot 29 and abuts the flanges 30 and 31 of the casing.

Referring to FIG. 4, the roller 27 has a pair of journals 33 and 34 extending laterally therefrom along its longitudinal axis of rotatably mounting the roller 27 within the modular screen unit 10. The end cap 14 preferably is provided with an internal bearing bracket 35 into which the journal 33 is rotatably mounted. The opposite end cap 15 preferably has a bore with a bearing 37 through which the journal 34 extends so as preferably to provide an exposed end projecting from the casing of the modular screen unit 10.

The exposed end of the journal 34 is fitted with a coupling member 38 preferably in the form of a clutch portion. As will be later more apparent, the coupling member 38 is adapted to cooperate with a similar member on the modular drive motor unit 11 to drive roller 27; and the coupling member has the capability of being releasably engaged with the similar member to permit ready separation of the modular drive motor unit 11 from the modular screen unit 10.

The modular drive motor unit 11 preferably has an outer casing or housing 41 which includes an outer wall constructed to afford an inner chamber. A pair of removable end caps 43 and 44 for the housing 41, substantially close the opposite ends of the inner chamber. The end cap 43 is secured to the housing 41 by machine screws 45 passing through inwardly extending flanges 47 of the end cao 43 which embrace the outer wall of the housing. The other end cap 44 is secured to the interior of the outer wall of housing 41 by sheet metal screws 48 pass through the end portion of the outer wall and are threaded into the inwardly extending flanges 50 carried by the end cap 44.

As best seen in FIGS. 4 and 5, the modular drive motor unit 11 has an internal plate 51 detachably mounted therein by screws 52 passing through the outer wall of housing 41 and threaded into the inwardly extending flanges 54 carried by the internal plate 51. A motor assembly, generally designated 55, is mounted on the internal plate 51 by a plurality of threaded bolts 57 passing through the internal plate 51 and threaded into the motor assembly 55. The motor assembly 55 has a drive shaft 58 to which, at its outwardly projecting free end, is secured a coupling member 60 preferably in the form of a clutch portion. The coupling member 60 is preferably spaced inwardly from the end cap 44 and is shaped to engage the complementary, mating, roller coupling member 38 when one of the coupling member 38 and 60 is moved longitudinally into the other coupling member. In other words, the complementary coupling members each may have male and female portions which interfit to provide a driving relationship between the members. When the coupling member 38 of the roller 27 and the coupling member 60 of the motor assembly 55 are in engagement, the motor assembly 55 will turn the coupling members 38 and 60 and, thus, will also drive the roller 27 which is journaled in the modular screen unit 10.

As seen most clearly in FIG. 3, the end cap 44 is provided with a plurality of apertures to permit insertion of any components protruding from the end cap 15 of the modular screen unit 10. The cooperating parts of the confronting end caps 15 and 44 aid in guiding and centering the modular drive motor unit 11 with respect to the modular screen unit 10 so that the modular drive motor unit 11 becomes preferably an extension of the modular screen unit 10.

The aperture 61 permits insertion of the coupling member 38 into the modular drive motor unit 11 for engagement with its complementary coupling member 60. A paur of guiding studs 62 carried by the end cap 15 fit into respective guide openings 64 which are formed in the end cap 44, which end cap functions as a guide plate. A male type electric plug 65 carried by the end cap 15 is fittable into a rectangular aperture 67 defined by the end cap 44 so as to engage a female type electric plug 68 secured to the internal plate 51.

Another opening 70 in the end cap 44 receives the end portion of a pivoted lever 71 carried by the end cap 15 which detects the fully closed position of the screen 24. Still another opening 72 in the end cap 44 receives the end portion of a second pivoted lever 74 carried by the end cap 15 which detects the fully exposed position of the screen 24.

The modular drive motor unit 11 is detachably secured to the modular screen unit 10 by four elongated bolts 77 preferably sharply pointed, each of which extends longitudinally through the modular drive motor until 11 and is threaded into the confronting end cap 15 of the modular screen unit 10.

The heads 78 of the bolts 77 are exposed on the exterior of the end cap 43 of the modular drive motor unit 11. When the modular drive motor unit 11 is separated from the casing, each of the bolts 77 is maintained in a predetermined withdrawn position (shown in phantom in FIG. 5) by an appropriately positioned nut 80 on an intermediate portion of the bolt 77, the nut 80 abutting the interior plate 51.

Thus, when it is desired to mount the modular drive motor unit 11 on the end of the modular screen unit 10, the guide portions on the respective end caps 15 and 44 are first utilized to correctly place the modular drive motor unit 11 against the end of the modular screen unit 10. Then, each end of the pointed bolts 77 can be slid longitudinally through their respective openings 81 in the end cap 4 and screwed into their respective threaded apertures 82 on the end cap 15 of the modular screen unit 10. The bolts 77 are easily aligned within the modular drive motor unit 11 because the bolts 77 are guided and directed by aligned passages 84 and 85 placed in the end cap 43 and the internal plate 51, respectively, and through which the bolts 77 pass.

When the modular drive motor unit 11 is detached from the modular screen casing 10, the motor assembly may then be removed from the outer wall of housing 41. By withdrawing the screws 45 and 52, the end cap 43 and the internal plate 51, respectively, are detached from the outer wall housing 41 thereby permitting withdrawal of the end cap 43, the internal plate 51, the motor assembly 55, and the bolts 77 as a single unit from the housing 41. Thereafter, the screws 57 may be removed to release the motor assembly 55 from its position between the end cap 43 and the internal plate 51 thereby permitting convenient repair or replacement of the motor assembly 55.

2. Control Mechanism for Motor Driven Screen

Schematically illustrated in FIG. 12 is an electrical circuit particularly suited to control the operation of the motor driven projection screen described herein.

The circuit includes a small reversible synchronous electric motor 90, a source of electric current 91, and a three condition master control switch 92. The master control switch 92 is usually conveniently located on a wall somewhere beneath the screen so that it is accessible for manual operation. The lower area enclosed within the dashed line 94 is the portion of the circuit disposed within the modular drive motor unit 11, while the upper area enclosed within the dashed line 95 is the portion of the circuit disposed within the modular screen unit 10.

The circuit portion within the modular screen unit 10 includes a pair of normally-closed electric switches 96 and 97 which are connected to the male plug 65 by appropriate electrical lines. The master control switch 92 and the electric motor 90 are connected to the female plug 68 by appropriate electrical lines. Electric current to drive the circuit is supplied through electrical lines 98 and 99. When the male plug 65 and the female plug 68 are mated and electrically connected, the screen 24 may be operatively raised and lowered.

Since switches 96 and 97 are normally urged to a closed, electrical conducting condition, then as long as these switches are closed, the rotation of the roller 27 and the raising and lowering of the flexible screen 24 is controlled by the master switch 92. As will be subsequently made apparent, switch 96 is moved to open condition to disconnect the motor 90 only when the screen is fully wound on the roller in closed position (FIG. 6), and switch 97 is moved to open condition to disconnect the motor 90 only when the screen is unwound from the roller to exposed operative position (FIG. 7).

A. Control Mechanism for Locating Screen in Closed Position

Referring in particular to FIGS. 6, 7, 9 and 12, the control mechanism for detecting or locating the screen 24 in a closed nested position and for terminating operation of the motor 90 is shown. The control mechanism primarily includes the mechanical pivoted lever 71 and the electric switch assembly 96 which is anchored against the internal surface of the end cap 15 by sheet metal screws 100.

The elongate lever 71 preferably has a pair of upwardly extending spaced flanges 101 which are pivoted to a pair of outwardly projecting fingers 102 of the end cap 15 by a pin 104. The lever 71 is normally urged to gravity (or by suitable spring means) away from the switch assembly 96, as shown in FIG. 7 and in phantom in FIG. 9.

The switch assembly 96 has a body portion preferably provided with a plunger or button 107 which is spring urged outwardly of the body portion to normally close the switch assembly (FIG. 7). The switch assembly 96 is also preferably provided with a plunger actuating arm 105 anchored in the body portion. The arm 105 may be of resilient material to afford movement toward and away from the plunger 107 to control the electrical condition of the switch assembly 96. Thus, in FIG. 6, the arm 105 has been caused to depress plunger 107 to open the switch assembly; while in FIG. 7, the arm 105 has been released to allow the plunger 107 to be spring-urged outwardly to close the switch assembly.

The lever 71 and the switch assembly 96 are positioned to cooperate with an actuating portion preferably near an end of the slat 25 so that the screen in closed position (FIG. 6) is accurately and precisely positioned with the slat 25 fully and tightly nested in the casing slot 29. In fact, the circuit to the motor is not interrupted, and roller rotation stopped, until the fully nested, closed position of the flexible screen is attained.

Thus, when the screen 24 is to be retracted from an exposed position (FIG. 7) to a closed position (FIG. 6), the operator merely shifts the master control switch 92 to position A (FIG. 12) to complete a circuit between the power source 91 and the electric motor 90. The motor 90 drives the roller 27 in a direction to cause the screen 24 to be wound about the roller 27 and thereby effect retraction of the screen 24 into the modular screen unit 10. As the screen approaches full retraction and the slat 25 begins to nest between the flanges 30 and 31 within the casing slot 29, the actuating portion of slat 25 (FIGS. 6 and 9) will contact and pivot the lever 71 upward to move arm 105 which depresses plunger 107, so that the switch assembly 96 opens the circuit and stops the motor 90.

This control mechanism described above is actuated independently of the master control switch 92. Thus, a person operating the screen can hold the master control switch 92 toward position A (screen closing condition), but when the screen 24 reaches its closed position, its movement will automatically stop even though the master control switch 92 remains engaged. Hence, the operator need not carefully regulate the master control switch 92 since operation will automatically cease as soon as the slat 25 is fully nested.

When the screen 24 is to be lowered from a closed position, the master control switch 92 is shifted to position B (FIG. 12) to complete a circuit between the power source 91 and the electric motor 90. The motor 90 then runs in reverse to cause the screen 24 to be unwound from the roller 27 and thereby effect extension of the screen 24 from the modular screen unit 10. When the slat 25 is unnested, the lever 71, by gravity and by spring action of the switch assembly 96, returns to its downward position so that the plunger 107 is urged outwardly and the switch 96 is closed once again to condition the circuit again for retraction of the screen 24.

Of course, the screen 24 may be stopped at any intermediate position between its fully extended exposed and fully retracted closed position by appropriate flipping of the master control switch 92.

B. Control Mechanism for Locating Screen in Viewing Position

Referring in particular to FIGS. 6, 7, 8 and 12, the control mechanism for detecting that the screen 24 has unwound to a fully exposed viewing position and for terminating the operation of the motor 90 is shown. The control mechanism primarily includes the pivoted lever 74 and the electric switch assembly 97 which is secured to the inner surface of the end cap 15 my machine screws 108.

The lever 74 preferably has a pair of upwardly extending spaced flanges 109 which are pivoted to a pair of outwardly projecting fingers 110 of the end cap 15 by a pin 111. The lever 74 is of a length to overlie the screen convolutions on the roller 27 and is normally urged toward the roller by a U-shaped leaf spring 114 embracing the pin 111 and having its opposite ends bearing against the end cap 15 and the web portion joining the flanges of the lever (FIGS, 6, 8). The lever 74 terminates in a free end portion 112 extending transversely of the lever toward the roller.

The electric switch assembly 97 is positioned preferably immediately below the web portion of the lever and is provided with a spring-urged plunger or button 120 which is normally urged outwardly of the body of the switch assembly 97 to normally close the switch assembly (FIG. 8). When the spring-urged lever 74 is permitted to move toward the roller 27 (counterclockwise in FIG. 8) then the web portion of the lever 78 exerts sufficient force to depress the plunger 120 to open the circuit through the switch assembly 97.

The free end portion 112 of the lever 74 is preferably tapered to a rounded screen contacting tip (FIGS, 6, 7). The portion 112 is also of such length as to maintain the lever 74 out of engagement with the plunger 120 as long as the free end portion bears against the screen 24, as shown in FIGS. 6 and 8.

Thus, the free end portion 112 is positioned to ride on the screen 24 and will circumscribe an imaginary ring about the roller 27 and the convolutions of screen 24 thereon as the roller 27 is rotated about its axis. When the screen is unwound to its fully extended open viewing position, there are two or three convolutions or turns of screen material still encircling the roller 27. The remaining turns as well as the adherence of the transverse margin edge of the screen 24 to the roller 27 firmly attach the screen 24 to the roller 27. These remaining two or three turns have a cut-out slot 115 along the imaginary ring so as to expose a depression 117 formed in the roller 27 along the imaginary ring.

When the screen 24 is fully extended, the end portion 112 of lever 74 is urged through the slot 115 in the screen material and into the depression 117 of the roller 27. When the end portion 112 is spring-urged into the depression 117, the web portion of the lever 74 moves against and depresses the plunger 120 of the switch assembly 97 to open the circuit between the power source 91 and the motor 90 so that the operation of the motor 90 is terminated and the roller 27 ceases rotation.

It is also apparent that the end portion 112 abuts and engages an edge 118 of the depression 117 in the roller 27 when the end portion rides downwardly into the depression. This engagement effects an auxiliary braking action further to prevent rotation of the roller 27.

Just as in the control mechanism for locating the screen in closed position, as described above, the cessation of unwinding of the screen 24 from the roller 27 is automatic when the screen is at its fully-exposed operative viewing position even though the master switch 92 is closed. It is independent of operator control at the master control switch 92 so that there is no need for the operator to play the screen 24 up or down to its proper position because the screen automatically stops in its proper position.

When the master control switch 92 is shifted to position A (FIG. 12) to rewind the screen 24, rotation of the roller 27 causes the end portion 112 to ride up a ramp or cam 121 formed as part of the roller defining the depression 117. The end portion 112 thereafter rides from the cam to the back surface of the screen 24 which is being rewound on the roller 27 so that each convolution covers the cut-out slot 115 (FIG. 6). The position of the lever 24 thereafter has no effect on the electric circuit, since the plunger 120 is released once again and closes the switch 97 and re-establishes an operative circuit between the master control switch 92 and the motor 90.

3. Electric Motor Brake for Motor-Driven Movie Screen

The electric motor and brake mechanism are particularly shown in FIGS. 4, 10 and 11. The motor assembly 55 generally comprises a gear motor including the small reversible synchronous electric motor 90, a reduction gear assembly, generally designated 124, and a brake assembly, generally designated 125. The motor is of the type which automatically applies a braking action when the circuit to the motor is broken.

The motor 90 has a stator or electromagnet 127 and a rotor 128 which is mounted on a shaft 130. One end of the shaft is preferably journaled in a bearing 133 of a reduction gear housing 138, and this end has a spline 136 which engages a gear 137 in the gear train in the reduction gear housing 138, which gear 137, in turn, through well-known means, regulates the rotative turning of the output drive shaft 58 of the assembly.

As earlier referred to, the coupling member 60 is fixed to one end of the drive shaft 58. The gear reduction housing 138 is mounted to the internal plate 51 by machine screws 57 and, in turn, the electric motor 90 is mounted to the gear reduction housing 138 by screws 140 threaded through a four-sided motor supporting frame 135.

The other end 148 of shaft 130 is journaled in bearing 134 which is carried by a cup-shaped member 131 of generally octagonal shape which affords a brake-supporting outer face 131a. The member 131 is affixed to the end of stator 127 in any convenient manner as by bolts passing through the stator and threaded into the frame 135. The addition of member 131 enables the braking surfaces to be moved from within the motor housing to an accesible location outside such housing; it enables the area of braking surfaces to be greatly increased; and it enables the ready adjustment of spring pressure and thus of braking forces.

A coiled spring 141 preferably encircles the other end 148 of the shaft 130, and the spring bears at its opposite ends against a pair of friction-reducing nylon washers 143 and 144 which are in turn disposed between the rotor 128 and a bearing bracket 145. A fiber sleeve 154 loosely encircles spring 141 and loosely bears between nylon washers 143 and 144.

Mounted on or adhered to the supporting face 131a of member 131 is a resiliently flexible rubber disk 147, which is slightly hard and acts as a first braking surface. Mounted on the end 148 of the shaft 130 is a supporting disk 150, which may be made of plastic carrying a medium grade sandpaper on its surface 151. Surface 151 confronts the exposed surface of the rubber disk 147 and acts as a second braking surface. A set screw 152 permits axial adjustment of the supporting disk 150 on the shaft end 148, thereby to adjust the compression in the spring 141 and the force between the braking surfaces.

The shaft 130 and its attached rotor 128 are arranged for limited axial movement. The spring 141 normally urges the shaft toward the gear reduction housing 138 so that the second braking surface is urged against the first braking surface, as shown in FIG. 11, to prevent rotation of the shaft 130. When the motor 90 is actuated, the rotor 128 automatically is pulled into alignment with the lines of force generated by the stator 127 (to the right as shown in FIG. 10). By its movement into alignment with the magnetic field, the rotor 128 compresses the spring 141 to move the supporting disk 150 outward so as to release the braking surfaces and permit rotation of the shaft 130, which drives the reduction gear train and output shaft 58, and ultimately rotates the roller 27.

Thus, when the screen is to be stopped at any position by opening the circuit between the motor 90 and the master control switch 92, the spring 141 urges the shaft 130 axially toward the reduction gear housing 138 (FIG. 11) so that the disks 147 and 150 are frictionally engaged to prevent further rotation of the shaft 130 to retain the screen 24 against movement.

It can be appreciated that the brake pressure may be altered by resetting the tension in the spring 141 to increase or decrease the force per unit area by shifting the position of disk 150 on the shaft end 148. In addition, the braking surface area is readily accessible and can be easily altered by changing the disks 147 and 150. Furthermore, by affording an outer enlarged brake supporting surface 131a, the effective area of braking action can be greatly enlarged to prolong the effective life of the braking surfaces.

I claim:

1. A control device for an electric motor unit of a projection screen apparatus adapted to position a predetermined length of flexible screen for viewing, comprising: an elongate roller provided with spaced bearings for rotatably supporting the opposite end portions of the roller, one end portion of the roller being operatively connected to the electric motor unit to rotate the roller when the motor unit is actuated; means defining a depression in the lateral surface of the roller; support means for securing the bearings to a supporting surface; a flexible screen having a transverse marginal edge portion secured to said rotatable roller, said screen being wound upon said roller when in closed position and being unwound from said roller when in exposed viewing position, the screen having a cut-out portion affording an opening which exposes the depression in the roller when the screen is in viewing position; switch means movable between a non-conductive open condition and a closed condition making an electrical connection with the motor unit to rotate the roller and unwind the screen toward viewing position, the switch means being mounted adjacent the roller; and a movable member mounted adjacent the switch means and positioned to cooperate therewith to said switch means to move from closed condition to open condition, the movable member being normally urged toward the roller and having an end portion normally bearing against screen wound about the roller, the end portion being positioned to move tnrough the opening in the screen into the depression in the roller when the screen is in viewing position, the movement of said end portion causing the switch means to move from closed condition to open condition to electrically disconnect the motor unit and arrest rotation of the roller.

2. A control device as specified in claim 1, in which the transverse marginal edge portion of the screen has a plurality of convolutions encircling the roller when the screen is in viewing position, and the cut-out portion of the screen extends through each of said convolutions.

3. A control device as specified in claim 1, in which the switch means and the movable member are positioned adjacent said one end portion of the roller.

4. A control device as specified in claim 1, in which the switch means includes a plunger normally spring-urged to closed condition, and the movable member depresses the plunger when moving into the depression in the roller.

5. A control device as specified in claim 4, in which the movable member is a pivoted arm normally spring-urged toward the plunger and toward the roller.

6. A control device as specified in claim 1, in which brake means are provided to arrest rotation of the roller, said brake means being applied automatically when the switch means is moved to open condition.

7. A control device as specified in claim 1, in which the depression in the roller is provided with a camming surface on the trailing side of the depression as the roller is rotating to unwind the screen, the end portion of the movable member being urged outwardly of the depression by said camming surface when the roller is rotated to wind the screen upon the roller.

8. A control device as specified in claim 1, in which the depression on the roller has a stop portion on the leading side of the despression as the roller is rotated to unwind the screen, the end portion of the movable member being engageable with the stop portion when the screen is in viewing position to assist in arresting roller rotation.

9. A motor driven wall-type projection screen apparatus adapted to be mounted on a supporting surface, comprising: an elongate roller provided with spaced bearings for rotatably supporting the opposite end portions of the roller; means defining a depression in the lateral surface of the roller support means for securing the bearings to the supporting surface; a flexible screen having a transverse marginal edge portion secured to said rotatable roller and a free marginal edge portion suspended from the roller, said screen being wound upin said roller when in closed position and being unwound from said roller when in exposed operative position, the screen having a cut-out portion affording an opening which exposes the depression in the roller when the screen is in viewing position; a reversible electric drive unit operatively connected to one end portion of the roller for rotating the roller to move said screen to exposed operative position and to close position; circuit means for making an electrical connection with the drive unit, the circuit means including first switch means for actuating the drive unit to move the screen toward exposed operative position and second switch means positioned adjacent the roller, said second switch means being movable between an actuating position and an inoperative position and being normally urged to actuating position, the second switch means when in inoperative position electrically interrupting the circuit means to the drive unit; and means for moving the second switch means to inoperative position when a predetermined length of screen has been unwound from the roller; said means being normally urged toward the roller and being positioned for movement into the depression when the screen is in exposed operative position, the movement causing said means to engage and move the second switch means to inoperative position to open the circuit means and stop movement of the drive unit and of the roller.

10. A control device for an electric motor unit of a rotatable roller adapted to unwind a predetermined length of flexible material from the roller, comprising: an elongate roller provided with spaced bearings for rotatably supporting the opposite end portions of the roller, one end portion of the roller being operatively connected to the electric motor unit to rotate the roller when the motor unit is actuated; means defining a depression in the lateral surface of the roller; support means for securing the bearings to a supporting surface; a length of flexible material having a transverse marginal edge portion secured to said rotatable roller, said material being wound upon said roller when in closed position and being unwound from said roller when in exposed open position, the material having a cut-out portion affording an opening which exposes the depression in the roller when the material is in exposed open position; switch means movable between a non-conductive open condition and a closed condition making an electrical connection with the motor unit to rotate the roller and unwind the material toward open position, the switch means being mounted adjacent the roller; and a movable member mounted adjacent the switch means and positioned to cooperate therewith to cause said switch means to move from closed condition to open condition, the movable member being normally urged toward the roller and having an end portion normally bearing against the material wound about the roller, the end portion being positioned to move through the opening in the flexible material into the depression in the roller when the material is in open position, the movement of said end portion causing the switch means to move from closed condition to open condition to electrically disconnect the motor unit and arrest rotation of the roller.

* * * * *